United States Patent
Hilker et al.

(10) Patent No.: US 10,040,900 B2
(45) Date of Patent: Aug. 7, 2018

(54) THERMOSETTING RESIN COMPOSITION

(71) Applicant: DSM IP ASSETS B.V., Heerlen (NL)

(72) Inventors: Iris Hilker, Echt (NL); Johan Franz Gradus Antonius Jansen, Echt (NL); Willem Posthumus, Echt (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 293 days.

(21) Appl. No.: 14/441,298

(22) PCT Filed: Nov. 12, 2013

(86) PCT No.: PCT/EP2013/073608
§ 371 (c)(1),
(2) Date: May 7, 2015

(87) PCT Pub. No.: WO2014/076072
PCT Pub. Date: May 22, 2014

(65) Prior Publication Data
US 2015/0291734 A1  Oct. 15, 2015

(30) Foreign Application Priority Data

Nov. 14, 2012 (EP) .................... 12192618

(51) Int. Cl.
| | |
|---|---|
| *C08G 63/91* | (2006.01) |
| *C08G 59/14* | (2006.01) |
| *C08F 283/01* | (2006.01) |
| *C08K 5/00* | (2006.01) |
| *C08K 5/3432* | (2006.01) |

(52) U.S. Cl.
CPC .......... *C08G 63/918* (2013.01); *C08F 283/01* (2013.01); *C08G 59/1477* (2013.01); *C08K 5/0091* (2013.01); *C08K 5/3432* (2013.01)

(58) Field of Classification Search
CPC . C08G 63/918; C08G 59/1477; C08F 283/01; C08K 5/3432; C08K 5/0091
See application file for complete search history.

(56) References Cited

U.S. PATENT DOCUMENTS

| | | | | |
|---|---|---|---|---|
| 3,093,679 A | * | 6/1963 | Miller | ................ C08K 5/18 560/43 |
| 4,042,646 A | * | 8/1977 | Edamura | ........... C08F 299/0442 525/22 |
| 6,281,295 B1 | * | 8/2001 | Broussard | ............. C07C 225/14 525/293 |
| 2005/0159515 A1 | | 7/2005 | Wiegner et al. | |
| 2010/0048824 A1 | * | 2/2010 | Jansen | ................... C08F 283/01 525/329.5 |

FOREIGN PATENT DOCUMENTS

| | | | | |
|---|---|---|---|---|
| GB | 1 107 327 | | 3/1968 | |
| WO | WO 2011/098562 | | 8/2011 | |
| WO | WO 2011098562 A1 | * | 8/2011 | ........ C08F 299/0492 |
| WO | WO 2012006263 A1 | * | 1/2012 | .......... B01J 31/2217 |

OTHER PUBLICATIONS

International Search Report for PCT/EP2013/073608 dated Jan. 13, 2014, 3 pages.
Written Opinion of the International Searching Authority for PCT/EP2013/073608, 4 pages.
Jürgen H. Aurer, *Unsaturated Polyester Resins*, BÜFA Reaktionsharze GmbH & Co. and DSM Composite Resins AG, pp. 4-25 (2003).

* cited by examiner

*Primary Examiner* — Randy P Gulakowski
*Assistant Examiner* — Ha S Nguyen
(74) *Attorney, Agent, or Firm* — Nixon & Vanderhye P.C.

(57) ABSTRACT

This invention relates to a radically curable resin composition comprising: a) An unsaturated polyester resin and/or a methacrylate functional resin, b) Reactive diluent, c) A copper salt, copper complex, iron salt and/or iron complex, and d) An enaminone.

22 Claims, No Drawings

THERMOSETTING RESIN COMPOSITION

This application is the U.S. national phase of International Application No. PCT/EP2013/073608 filed 12 Nov. 2013, which designated the U.S. and claims priority to EP Patent Application No. 12192618.2 filed 14 Nov. 2012, the entire contents of each of which are hereby incorporated by reference.

The present invention relates to room temperature radically curable, thermosetting resin compositions comprising (a) unsaturated polyester resin and/or methacrylate functional resin, (b) reactive diluent and (c) a transition metal compound soluble in the mixture of resin (a) and reactive diluent (b). The transition metal compound acts as accelerator for the curing (crosslinking) of the resin composition at room temperature, which curing is initiated by free radicals generated preferably by the decomposition of peroxide. The term "room temperature radically curable, thermosetting resin composition" means that the resin composition is capable of being subjected to conditions at room temperature which render the composition to a cured or thermoset state and that the curing is initiated by free radicals.

Unsaturated polyester (UP) resin compositions and methacrylate functional resin compositions are widely used for various structural applications such as for instance in boats, windmill blades, tanks and pipes, SMC, BMC etc. Nowadays styrene is still commonly applied as reactive diluent of choice. In fact many of the desired properties of the cured unsaturated polyester resin compositions and cured methacrylate functional resin compositions are due to the use of styrene.

Curing of resin compositions comprising an unsaturated polyester resin and/or methacrylate functional resin can be done by a free-radical chain growth crosslinking polymerization between the unsaturation in the reactive diluent and the unsaturation in the resin backbone, present in the resin composition. The free-radical chain growth crosslinking polymerization is initiated by free radicals which can be generated by the decomposition of peroxides, in which case peroxides are used as initiators for the free-radical chain growth crosslinking polymerization. To accelerate the decomposition of the peroxide, an accelerator can be used. The state of the art unsaturated polyester systems in styrene generally are being cured under the influence of peroxides and are frequently pre-accelerated by the presence of metal compounds like for instance cobalt salts in order to be able to effect the curing at room temperature. Cobalt naphthenate and cobalt octanoate are the most widely used accelerators; see for instance EP-0761737-A1, JP-42005092 B, U.S. Pat. No. 4,329,263, U.S. Pat. No. 3,584,076, U.S. Pat. No. 3,297,789. An excellent review article of M. Malik et al. in J.M.S.—Rev. Macromol. Chem. Phys., C40(2&3), p. 139-165 (2000) gives a good overview of the current status of these resin systems. Curing is addressed in chapter 9.

The strong beneficial effect of styrene on the desired mechanical properties makes it very difficult to replace styrene with other reactive diluents without detrimentally affecting the mechanical properties of the cured objects. However due to environmental reasons, especially the increased concerns around the safety of the workers when working with styrene, there is a strong desire to replace styrene in unsaturated polyester resin/methacrylate functional resin compositions without negatively affecting the curing and/or the mechanical properties too much.

The possibility to use vinyl esters as styrene replacement in light of the above mentioned environmental concerns has already been reported by Froehling in 1982 (Journal of Applied Polymer Science, Vol. 27, p. 3577-3584 (1982)). In this paper he described the curing of unsaturated polyester resin (UP)-Vinyl ester mixtures using the well-known Cobalt based or Vanadium based system. The fact that he used a cure profile of 24 hours at room temperature followed by 24 hours at 60° C. and by 24 hours at 80° C. or 100° C., i.e. a total cure cycle of 72 hours strongly indicates that the standard Co or V based cure systems are insufficient with respect to reactivity at lower temperatures, like for instance room temperature. In fact, as will be demonstrated in the experimental part, when using V or Co, it is very difficult to cure an unsaturated polyester resin diluted in a vinyl ester at room temperature.

Besides this insufficient reactivity at room temperature, both metals catalysts suffer from other serious drawbacks. For instance, the use of cobalt salts as transition metal catalyst in UP resins is nowadays of even higher environmental concern than styrene as it is even anticipated that the used cobalt salts will be classified as being carcinogenic. Toxicological background can be found in J. Environ. Monit., 2003, 5, 675-680, Woodhall Stopford et al., Bioaccessability testing of cobalt compounds. Using vanadium always results in dark green objects thereby making it unsuitable for any application in which colors are important such as for instance gel coats. Furthermore using vanadium can have a detrimental influence on the storage stability. For example, using an unsaturated polyester resin in styrene, the storage stability when using a vanadium complex is limited as the resin with the V inside gelled spontaneously within 2 weeks of storage.

Consequently there is still a need for alternative (in terms of curing efficiency), but more environmental friendly cure systems for room temperature radical curing of resin compositions comprising unsaturated polyester resin and/or methacrylate functional resin and reactive diluent. Moreover, especially for room temperature radical curing of such resin compositions in which the reactive diluent is a vinyl ester, there is a need for improved cure systems. As used herein, a vinyl ester is a compound comprising at least one $CH_2=CHOC(O)-$.

The inventors have surprisingly found that efficient peroxide initiated curing at room temperature can be obtained when using a thermosetting resin composition comprising:
  a) Radically copolymerisable resin selected from the group consisting of unsaturated polyester resins, methacrylate functional resins and any mixture thereof,
  b) Reactive diluent [copolymerizable solvent],
  c) A copper salt, copper complex, iron salt and/or iron complex, and
  d) An enaminone.

It has surprisingly been found that the resin compositions according to the invention can be efficiently cured with a peroxide at room temperature. As used herein, efficient curing means that the gel time as can be obtained by peroxide room temperature curing of the resin composition of the present invention is comparable with or lower than the gel time as can be obtained with a similar resin composition comprising a) and b) and cobalt naphthenate or cobalt octanoate, but not c) and d), in case cobalt naphthenate or cobalt octanoate is able to accelerate the room temperature peroxide curing of similar resin compositions comprising a) and b), but not c) and d). In case cobalt naphthenate or cobalt octanoate is not able to sufficiently accelerate the room temperature peroxide curing of similar resin compositions comprising a) and b), but not c) and d), efficient curing means that the gel time as can be obtained by peroxide room temperature curing of the resin composition of the present invention is substantially shorter than the gel time as can be obtained with a similar resin composition comprising a) and b) and cobalt naphthenate or cobalt octanoate, but not c) and d). An additional advantage of the present invention is that a short peak time and/or high peak temperature can also be obtained. In the curing of unsaturated polyester resins and/or methacrylate functional resins, gel time is a very important characteristic of the curing properties, see for example W. D. Cook et al. in Polym. Int. Vol. 50, 2001. In addition also the time from reaching the gel time to reaching peak temperature, and the level of the peak temperature (higher peak temperature generally results in better curing) are important.

For example, the inventors surprisingly found that this cure system (combination of c), d) and peroxide) is able to provide very efficient room temperature curing of unsaturated polyester resins and/or methacrylate functional resins diluted in vinyl ester diluents. They furthermore surprisingly found that this cure system is also as efficient or even more efficient compared to the standard cobalt based cure systems for unsaturated polyester resins and/or methacrylate functional resins diluted in styrene, thereby also enabling an alternative or even a more efficient cure system for resins diluted in styrene.

An additional advantage of the present invention is that room temperature peroxide crosslinkable resin compositions are provided which can be used to prepare cured parts having improved Barcol hardness, in particular compared to similar resin compositions not comprising compound c) or to similar resin compositions not comprising compound c), but cobalt naphthenate or cobalt octanoate. The Barcol hardness is an indication of the degree of cure of the material.

It has surprisingly been found that only the combination of an enaminone d) with a copper salt, copper complex, iron salt and/or iron complex is able to provide efficient acceleration of room temperature peroxide curing of resin compositions comprising an unsaturated polyester resin and/or methacrylate functional resin (a) and reactive diluent (b) and/or improved Barcol hardness of the cured part, while the combination of enaminone d) with other transition metal salts or complexes, such as Co, V, Mn, Ti or Zr metal salts, does not provide efficient acceleration or provides less efficient acceleration and/or provides lower Barcol hardness of the cured part.

Thermosetting resin compositions harden by chemical reaction, often generating heat when they are formed, and cannot be melted or readily re-formed once hardened. The resin compositions are liquids at room temperatures and atmospheric pressures, so can be used to impregnate reinforcements, for instance fibrous reinforcements, especially glass fibers, and/or fillers may be present in the resin composition, but, when treated with suitable radical forming initiators (also referred to as curing agents or hardeners), the various unsaturated components of the resin composition crosslink with each other via a free radical copolymerization mechanism to produce a hard, thermoset mass (also referred to as structural part).

The unsaturated polyester resin as may be comprised in the resin composition according to the invention may suitably be selected from the unsaturated polyester (UP) resins as are known to the skilled man. Unsaturated polyester resins are characterised by having C═C unsaturations which are in conjugation with a carbonyl bond and preferably comprises fumaric and/or maleic acid building blocks. Examples of suitable unsaturated polyester resins to be used in the resin composition of the present invention are, sub-divided in the categories as classified by M. Malik et al. in J.M.S.—Rev. Macromol. Chem. Phys., C40(2&3), p. 139-165 (2000).

(1) Ortho-resins: these are based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

Besides these classes of resins also so-called dicyclopentadiene (DCPD) resins are categorized as unsaturated polyester resins. The class of DCPD-resins is obtained either by modification of any of the above resin types by Diels-Alder reaction with cyclopentadiene, or they are obtained alternatively by first reacting a diacid for example maleic acid with dicyclopentadiene, followed by the usual steps for manufacturing a unsaturated polyester resin, further referred to as a DCPD-maleate resin.

The resin composition according to the invention comprises radically copolymerizable resin. The radically copolymerizable resin present in the resin composition according to the invention is/are unsaturated polyester resin and/or methacrylate functional resin. Methacrylate functional resins are resins containing at least one methacrylate functional end group. This also includes the class of vinyl ester urethane resins (also referred to as urethane methacrylate resins). Preferred methacrylate functional resins are oligomers or polymers containing at least one methacrylate functional end group. Methacrylate functional resins having unsaturated sites only in the terminal position are for example prepared by reaction of epoxy oligomers or polymers (e.g. diglycidyl ether of bisphenol-A, epoxies of the phenol-novolac type, or epoxies based on tetrabromobisphenol-A) with for example methacrylic acid. Instead of methacrylic acid also methacrylamide may be used. Preferred methacrylate functional resins are urethane methacrylate resins and resins obtained by reaction of an epoxy oligomer or polymer with methacrylic acid or methacrylamide, preferably with methacrylic acid. Most preferred methacrylate functional resins are resins obtained by reaction of an epoxy oligomer or polymer with methacrylic acid.

The unsaturated polyester resin as may be comprised in the resin composition according to the invention preferably has a molecular weight $M_n$ in the range from 500 to 10000 Dalton, more preferably in the range from 500 to 5000 even more preferably in the range from 750 to 4000. As used herein, the molecular weight $M_n$ of the resin is determined in tetrahydrofurane using gel permeation chromatography according to ISO 13885-1 employing polystyrene standards and appropriate columns designed for the determination of the molecular weights. The unsaturated polyester resin preferably has an acid value in the range from 5 to 80 mg KOH/g resin, more preferably in the range from 10 to 70 mg KOH/g resin. As used herein, the acid value of the resin is determined titrimetrically according to ISO 2114-2000.

The methacrylate functional resin as may be comprised in the resin composition according to the invention preferably has a molecular weight $M_n$ in the range from 500 to 3000

Dalton, more preferably in the range from 500 to 1500. The methacrylate functional resin preferably has an acid value in the range from 0 to 50 mg KOH/g resin.

Preferably, in the resin composition according to the invention, the total amount of unsaturated polyester resin and methacrylate functional resin is from 20 up to and including 90 wt. % and the amount of reactive diluent is from 10 up to and including 80 wt. %. More preferably, in the resin composition according to the invention, the total amount of unsaturated polyester resin and methacrylate functional resin is from 25 up to and including 80 wt. % and the amount of reactive diluent is from 20 up to and including 75 wt. %. As used herein, all amounts in wt. % are given relative to the total weight of the unsaturated polyester resin, methacrylate functional resin and reactive diluent, unless otherwise specified.

The resin composition according to the present invention generally is free of blowing agents and contains less than 5 wt. % water.

The resin composition according to the present invention comprises reactive diluent (b) [copolymerizable solvent]. For clarity purpose, a reactive diluent is a diluent for the unsaturated polyester resins and methacrylate functional resins that are present in the composition according to the invention, and is able to copolymerize (due to the presence of at least one radical polymerizable unsaturated group) with the unsaturated polyester resins and methacrylate functional resins present in the composition according to the invention. Examples of suitable reactive diluents are, for instance, alkenyl aromatic monomer, such as for example styrene and divinylbenzene; vinyl esters, (meth)acrylates, vinyl ethers and vinyl amides but all other reactive monomers for use in the field of thermosetting resins as are known to the person skilled in the art can be used. Preferred reactive diluents are styrene, alpha-methyl styrene, chlorostyrene, vinyl toluene, divinyl benzene, tert.butyl styrene; diester of itaconic acid such as for example dimethyl itaconate; methyl methacrylate, tert.butylacrylate, butanediol dimethacrylate vinyl acetate, vinyl propionate, vinyl versatate, vinylbenzoate, divinyl adipate, divinyl phthalate, N-vinyl pyrolidone, N-vinyl caprolactam and mixtures thereof.

An enaminone is defined herein as a compound having a carbonyl group adjacent to the double bond of an enamine.

The enaminones which can be employed in the current invention can be prepared in various ways. Examples of various synthetic routes to enaminones can for instance be found in A. Z. A. Elassar, A. A. El-Khair, Tetrahedron, volume 59, pages 8463-8480, year 2003.

One of the more straight forward methods is the direct condensation of a primary or secondary amine with a 3-keto-ester, a 3-keto-amide, a 3-keto-ketone or a 3-keto-aldehyde, upon removal of the water formed. This water removal can for instance be performed via azeotropic distillation with various solvents suitable for an azeotropic distillation such as for instance toluene, methyl cyclohexane, ethanol etc. The choice of solvent generally depends on the boiling points of the starting materials and the solubility of the starting materials as well as the product.

Suitable 3-keto-esters are example ethylacetoacetate, propylacetoacetate, hydroxyethylacetoacetate, ethylene glycol bis acetoacetate, trimethylol propane tris acetoacetate, pentaerythritol tetrakis acetoacetate etc. Suitable 3-keto-amides are example acetoacetamide, N, N-dimethyl acetoacetamide, N, N-diethyl acetoacetamide, N-phenyl acetoacetamide etc. Suitable 3-keto-ketones are for example acetylacetone, benzoyl acetone, dibenzoyl methane, 1,3-cyclohexane dione etc. Suitable 3-keto-aldehydes are for example acetylacetaldehyde, benzoylacetaldehyde etc.

Suitable amines are for example ammonia, ethylamine, butylamine, benzyl amine, aniline, p-toluidine, ethanolamine, N-methyl ethanolamine, diethanolamine, piperidine, morpholine, piperazine, ethylene diamine, diethylene triamine, and polymeric diamines like Jeffamines® such as for instance Jeffamine® D230.

Bis-enaminones can be prepared via several routes. One route is the condensation of a 3-keto-ester, 3-keto-amide, 3-keto-ketone or 3-keto-aldehyde with a diamine. Suitable diamines are for example ethylene diamine, propylene diamine, but also polymeric diamines like Jeffamines®, for example Jeffamine® D230, can be used which results in a polymeric bis-enaminone. Alternatively, a bis-enaminone can be prepared via the preparation of an amine with for example a bis 3-keto ester like for example ethyleneglycol bis acetoacetate. Tris-enaminones can be prepared analogously based on for example triamines or based on for example a tris 3-ketoester like for example timethylol propane tris acetoacetate. Employing a bis amine and a bis 3-keto ester will result in a poly-enaminone with the enaminone functionality in the main chain. Polymeric enaminones with the enaminone functionality in the side chain can be prepared most easily from polymers with a 3-keto functionality in the side chain. An example with a 3-ketoketone in the side chain which is converted into a polymeric enaminone is described in E. F. Panarin, V. V. Kopeikin, Makromol. Chem. Volume 184, pages 701-716, year 1983. Polymers with a 3-keto ester in the side chain are even more readily prepared via radical polymerization of for example acetoacetoxy ethyl methacrylate with various other unsaturations such as for example (meth)acrylates, styrene, N-vinyl pyrrolidone and the like.

Besides these examples of a simple condensation to obtain an enaminone also the other synthetic routes such as for example mentioned in A. Z A. Elassar, A. A. El-Khair, Tetrahedron volume 59, pages 8463-8480, year 2003 can be used.

Preferably, the resin composition according to the invention comprises an enaminone group containing compound according to formula I as given below. More preferably, the enaminone(s) present in the resin composition according to the invention is (are) enaminone(s) according to formula I as given below.

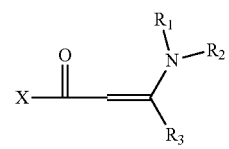

(I)

wherein
X=H, optionally substituted $C_1$-$C_{20}$ alkyl, optionally substituted $C_6$-$C_{10}$ aryl, optionally substituted $C_7$-$C_{20}$ alkylaryl, $OR_4$ or $NR_5R_6$,
in which the optional substituents are selected from the group consisting of ethers, hydroxyls, esters, tertiary amines, carboxylic acids and any combination thereof, and in which the substituent(s) can be part of an oligomer or polymer,
in which $R_4$, $R_5$ and $R_6$ are independently selected from an optionally substituted $C_1$-$C_{20}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, tertiary amines, carboxylic acids, enaminones and any combination thereof and in which the substituent(s) can be part of an oligomer or polymer;

$R_1$ and $R_2$ are independently selected from H, optionally substituted $C_1$-$C_{18}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, amines, carboxylic acids and any combination thereof, in which the substituent(s) can be part of an oligomer or polymer; and in which $R_1$ and $R_2$ can form a (hetero)cycle;

$R_3$=H, optionally substituted $C_1$-$C_{20}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, tertiary amines, carboxylic acids and any combination thereof; $R_3$ and X can form a (hetero)cycle.

X is preferably H, optionally substituted $C_1$-$C_{20}$ alkyl, optionally substituted $C_6$-$C_{10}$ aryl, $OR_4$ or $NR_5R_6$. More preferably, X is $C_1$-$C_6$ alkyl, $C_6$ aryl, $OR_4$ or $NR_5R_6$; in which $R_4$, $R_5$, $R_6$ is preferably optionally substituted $C_1$-$C_{20}$ alkyl, more preferably $C_1$-$C_6$ alkyl. $R_3$ is preferably optionally substituted $C_1$-$C_{20}$ alkyl, more preferably optionally substituted $C_1$-$C_{12}$ alkyl, more preferably $C_1$-$C_{12}$ alkyl and even more preferably $C_1$-$C_6$ alkyl.

Preferred substituents are selected from the group consisting of hydroxyl groups, ether groups and carboxylic acid groups.

In case at least one of $R_1$ and $R_2$ is H, tautomers of the compound according to formula I may be present in the resin composition according to the invention.

In one preferred embodiment, especially in view of the reactivity of the enaminone with formula I, $R_1$ and/or $R_2$ are/is optionally substituted $C_1$-$C_{18}$ alkyl, preferably optionally substituted $C_1$-$C_{12}$ alkyl. More preferably, $R_1$ and $R_2$ are optionally substituted $C_1$-$C_{18}$ alkyl, more preferably optionally substituted $C_1$-$C_{12}$ alkyl, more preferably $C_1$-$C_{12}$ alkyl and even more preferably $C_1$-$C_6$ alkyl. In another preferred embodiment, especially in view of the stability of the enaminone according to formula I, $R_1$ is optionally substituted $C_1$-$C_{18}$ alkyl, preferably optionally substituted $C_1$-$C_{12}$ alkyl, preferably $C_1$-$C_{12}$ alkyl, even more preferably $C_1$-$C_6$ alkyl and $R_2$ is optionally substituted $C_6$-$C_{10}$ aryl, preferably optionally substituted $C_6$ aryl, more preferably $C_6$ aryl.

In another preferred embodiment of the invention, the resin composition comprises an enaminone according to formula II as given below. More preferably, in this embodiment, the enaminone(s) present in the resin composition according to the invention is (are) enaminone(s) according to formula II as given below.

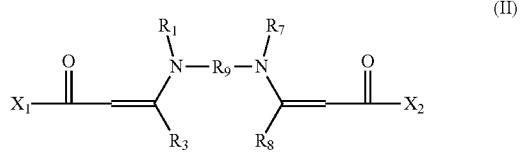
(II)

in which $X_1$ and $X_2$ are independently selected from H, optionally substituted $C_1$-$C_{20}$ alkyl, optionally substituted $C_6$-$C_{10}$ aryl, optionally substituted $C_7$-$C_{20}$ alkylaryl, $OR_4$ or $NR_5R_6$, in which the optional substituents are selected from the group consisting of ethers, hydroxyls, esters, tertiary amines, carboxylic acids and any combination thereof, and in which the substituent(s) can be part of an oligomer or polymer, in which $R_4$, $R_5$ and $R_6$ are independently selected from an optionally substituted $C_1$-$C_{20}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, tertiary amines, carboxylic acids, enaminones and any combination thereof and in which the substituent(s) can be part of an oligomer or polymer;

$R_1$ and $R_7$ are independently selected from H, optionally substituted $C_1$-$C_{20}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, amines, carboxylic acids and any combination thereof; $R_1$ and $R_7$ can form a (hetero)cycle;

$R_3$ and $R_8$ are independently selected from H, optionally substituted $C_1$-$C_{20}$ alkyl, optionally substituted $C_6$-$C_{10}$ aryl, optionally substituted $C_7$-$C_{20}$ alkylaryl, in which the optional substituents are selected from the group consisting of ethers, hydroxyls, esters, tertiary amines, carboxylic acids and any combination thereof; $R_3$ and $X_1$ resp. $R_8$ and $X_2$ can form a (hetero)cycle;

$R_9$=optionally substituted $C_2$-$C_8$ alkyl or optionally substituted $C_6$ aryl, in which the optional substituents are selected from the group consisting of ethers, hydroxyls, esters, tertiary amines, carboxylic acids and any combination thereof, in which the substituent(s) can be part of an oligomer or polymer.

Preferred substituents are selected from the group consisting of hydroxyl groups, ether groups and carboxylic acid groups.

In another preferred embodiment of the invention, the resin composition according to the invention comprises enaminone according to formula I and enaminone according to formula II as given above. More preferably, in this embodiment, the enaminone present in the resin composition according to the invention is a mixture of enaminones according to formula I and formula II as given above.

The amount of enaminone in the resin composition according to the invention may vary between wide limits. Preferably, the amount of enaminone in the resin composition is from 0.4 up to and including 400 mmol/kg (a)+(b) (thus relative to the total amount of unsaturated polyester resin and methacrylate functional resin (compound (a)) and reactive diluent (compound (b))). As used herein, in case the resin composition comprises enaminone according to formula I and/or II, the amount of enaminone is the total amount of enaminone according to formula I and II and the tautomers of these formulas which are present in the resin composition. The amount of enaminone in the resin composition is preferably equal to or higher than 0.5 mmol/kg (a)+(b), more preferably equal to or higher than 1 mmol/kg (a)+(b). The amount of enaminone in the resin composition is preferably equal to or lower than 200 mmol/kg (a)+(b), more preferably equal to or lower than 150 mmol/kg (a)+(b). In case the reactive diluent is a vinyl ester or mixture of vinyl esters and compound (c) is a copper salt and/or copper complex, the amount of enaminone in the resin composition is preferably equal to or higher than 6 mmol/kg (a)+(b). In case the reactive diluent is a vinyl ester or mixture of vinyl esters and compound (c) is an iron salt and/or iron complex, the amount of enaminone in the resin composition is preferably equal to or higher than 10 mmol/kg (a)+(b).

The copper salt, copper complex, iron salt and/or iron complex are preferably present in the resin composition in such amount that the total amount of copper and iron in the resin composition is equal to or higher than 0.0005 mmol/kg (a)+(b), more preferably equal to or higher than 0.001 mmol/kg (a)+(b), more preferably equal to or higher than 0.01 mmol/kg (a)+(b), more preferably equal to or higher than 0.1 mmol/kg (a)+(b). The copper salt, copper complex, iron salt and/or iron complex are preferably present in the resin composition in such amount that the total amount of copper and iron in the resin composition is equal to or lower than 50 mmol/kg (a)+(b), more preferably equal to or lower than 10 mmol/kg (a)+(b), even more preferably equal to or lower than 5 mmol/kg (a)+(b). Preferably, the copper salt, copper complex, iron salt and/or iron complex are present in the resin composition in such amount that the total amount of copper and iron in the resin composition is equal to or higher than 0.001 mmol/kg (a)+(b) and equal to or lower than 10 mmol/kg (a)+(b). More preferably, the copper salt, copper complex, iron salt and/or iron complex are present in the resin composition in such amount that the total amount of copper and iron in the resin composition is equal to or higher than 0.1 mmol/kg (a)+(b) and equal to or lower than 5 mmol/kg (a)+(b). In case the reactive diluent is a vinyl ester or mixture of vinyl esters and compound (c) is a copper salt and/or copper complex, the amount of copper is preferably equal to or higher than 0.001 mmol/kg (a)+(b), preferably equal to or higher than 0.1 mmol/kg (a)+(b); and the amount of copper is preferably equal to or lower than 5 mmol/kg (a)+(b). In case the reactive diluent is a vinyl ester or mixture of vinyl esters and compound (c) is an iron salt and/or iron complex, the amount of iron is preferably equal to or higher than 0.01 mmol/kg (a)+(b), preferably equal to or higher than 0.1 mmol/kg (a)+(b); and the amount of iron is preferably equal to or lower than 5 mmol/kg (a)+(b).

The resin composition comprises a copper salt, copper complex, iron salt and/or iron complex. In the context of the invention, all kind of copper salts/complexes and iron salts/complexes can be used. Preferably, the copper salt that may be present in the resin composition according to the invention is $Cu^+$ and/or $Cu^{2+}$ salt and the copper complex that may be present in the resin composition according to the invention is $Cu^+$ and/or $Cu^{2+}$ complex. More preferably, the copper salt/complex is a $Cu^+$ and/or $Cu^{2+}$ salt. The $Cu^+$ salt is preferably a $Cu^+$ halide, nitrate, acetyl acetonate and/or carboxylate; more preferably a $Cu^+$ carboxylate. The $Cu^{2+}$ salt is preferably a $Cu^{2+}$ halide, nitrate, acetyl acetonate and/or carboxylate, more preferably a $Cu^{2+}$ carboxylate. It will be clear that instead of a single copper compound, also a mixture of copper compounds can be used.

Preferably, the iron salt that may be present in the resin composition according to the invention is $Fe^{2+}$ and/or $Fe^{3+}$ salt and the iron complex that may be present in the resin composition according to the invention is $Fe^{2+}$ and/or $Fe^{3+}$ complex. More preferably, the iron salt/complex is a $Fe^{2+}$ and/or $Fe^{3+}$ salt. The $Fe^{2+}$ salt is preferably a $Fe^{2+}$ halide, nitrate, acetyl acetonate and/or carboxylate; more preferably a $Fe^{2+}$ carboxylate. The $Fe^{3+}$ salt is preferably a $Fe^{3+}$ halide, nitrate, acetyl acetonate and/or carboxylate, more preferably a $Fe^{3+}$ carboxylate. It will be clear that instead of a single iron compound, also a mixture of iron compounds can be used.

Preferably, the ratio of molar amount of enaminone and molar amount of copper and iron is from 15000:1 up to and including 1:100. More preferably, said molar ratio enaminone:(Cu+Fe) is from 7500:1 up to and including 1:10; even more preferably from 2500:1 up to and including 1:2, even more preferably from 2500:1 up to and including 1:1 and even more preferably from 2500:1 up to and including 2:1.

In case the reactive diluent is a vinyl ester or mixture of vinyl esters and compound (c) is a copper salt and/or copper complex, the ratio of molar amount of enaminone and molar amount of copper is preferably from 60000:1 to 2:1. In case the reactive diluent is a vinyl ester or mixture of vinyl esters and compound (c) is an iron salt and/or iron complex, the ratio of molar amount of enaminone and molar amount of iron is preferably from 6000:1 to 4:1.

The resin composition according to the invention may further comprise a base because this can result in a more efficient curing, i.e. shorter gel time and/or higher peak temperature. The base is preferably an organic base with $pK_a \geq 10$ and/or the base is an alkali metal and/or earth alkali metal compound. More preferably, the resin composition comprises a base selected from the group consisting of alkaline bases, earth alkaline bases, amines and any mixture thereof. The amine is preferably a tertiary amine and/or secondary amine. More preferably, the base is an alkaline base. The alkaline base is preferably selected from the group consisting of lithium carboxylate, sodium carboxylate, potassium carboxylate and any mixture thereof. The carboxylate is preferably a $C_6$-$C_{20}$ carboxylate.

Preferably, the amount of the base is from 0.001 to 2000 mmol/(kg of unsaturated polyester resin, methacrylate functional resin and reactive diluent). More preferably, the amount of the base is from 3 to 150 mmol/(kg of unsaturated polyester resin, methacrylate functional resin and reactive diluent).

According to an embodiment of the invention, the resin composition further comprises additional ligands (next to enaminone). The additional ligands are preferably selected from the group consisting of aromatic amines, thiols, 1,3-dioxo compounds, aromatic hetero-cycles, hydroxyketon compounds, bispidones and any mixture thereof. Examples of suitable aromatic amines are aniline, toluidine, N,N-dimethyl aniline and N,N-diisopropanol toluidine. Examples of suitable thiols are cysteine, methylolpropane tris mercapto acetate and pentaerythritol tetrakis mercapto propionate. Examples of suitable 1,3-dioxocompounds are acetylacetone, ethyl acetoacetate, acetoacetamide and N,N-diethyl acetoacetamide. Examples of suitable aromatic hetero-cycles are pyridine, and derivatives like 4-dimethylaminopyridine, pyrazine, pyridazine, pyrimidine, bipyridine, 1,10-phenanthroline, and thiophene and derivatives thereof. An example of a suitable hydroxyketone is hydroxyl acetone. Suitable bispidone ligands are for example the dimethyl 2,4-di-(2-pyridyl)-3-methyl-7-(pyridine-2-ylmethyl)-3,7-diaza-bicyclo[3.3.1]nonan-9-one-1,5-dicarboxylate and its derivatives, like for instance the hydrate form (9,9-dihydroxy) or variants like the diethyl or the 3-octyl variant. Within the current invention also mixtures of these ligands can be used. Also preformed complexes of these additional ligands with copper and/or iron can be used in the present invention.

According to another embodiment of the invention next to copper and/or iron and the optional alkali and/or earth alkali metal base, other metals can be present. Suitable metals are for example salts and/or complexes of manganese, vanadium, nickel, zinc and even cobalt can be used. Preferably the additional metal is manganese.

Preferably, the resin composition is essentially cobalt free. Essentially free of cobalt as used here means that the cobalt concentration is lower than 0.02 mmol Co per kg unsaturated polyester resin, methacrylate functional resin and reactive diluent; preferably lower than 0.01 mmol Co per kg unsaturated polyester resin, methacrylate functional resin and reactive diluent; more preferably lower than 0.001 mmol Co per kg unsaturated polyester resin, methacrylate functional resin and reactive diluent. Most preferably the resin composition is free of cobalt. Preferably, the resin composition is further also essentially titanium free. Essentially free of titanium as used here means that the titanium concentration is lower than 0.02 mmol Ti per kg unsaturated polyester resin, methacrylate functional resin and reactive diluent; preferably lower than 0.01 mmol Ti per kg unsaturated polyester resin, methacrylate functional resin and reactive diluent; more preferably lower than 0.001 mmol Ti per kg unsaturated polyester resin, methacrylate functional resin and reactive diluent. Most preferably the resin composition is free of titanium.

For obtaining improved mechanical properties of the cured parts, the composition according to the invention preferably further comprises fibers. The type of fiber to be used depends on the type of application. According to another preferred embodiment the fibers are glass fibers. According to yet another preferred embodiment the fibers are carbon fibers.

For some applications, especially automotive applications, the compositions according to invention preferably further comprise low profile additives. These type of additives enables to obtain an object with an improved surface quality. Examples of these additives are for instance polymers like saturated polyesters and polyvinyl acetate.

The resin composition according to the invention may further comprise fillers and/or pigments.

The resin composition may further comprise a radical inhibitor which retards the peroxide initiated radical copolymerization of the resin with the reactive diluent. These radical inhibitors are preferably chosen from the group of phenolic compounds, hydroquinones, catechols, benzoquinones, stable radicals and/or phenothiazines. The amount of radical inhibitor that can be added may vary within rather wide ranges, and may be chosen as a first indication of the gel time as is desired to be achieved.

The present invention further relates to an accelerator solution suitable for forming a redox system with peroxides and for accelerating the radical curing of an unsaturated polyester and/or methacrylate functional resin composition, wherein the accelerator solution comprises (1) an enaminone and (2) a copper salt, copper complex, iron salt and/or iron complex. The ratio of molar amount of enaminone to molar amount of copper and iron is preferably from 15000:1 up to and including 1:100, more preferably from 7500:1 up to and including 1:10, even more preferably from 2500:1 up to and including 1:8, even more preferably from 500:1 up to and including 1:5 and even more preferably from 50:1 up to and including 1:2. Preferably, the accelerator solution further comprises a base as described above.

The present invention further relates to a multi-component system comprising at least two components in which one of the components is a resin composition as described above and at least one of the other components comprises a peroxide.

The present invention also further relates to a multi-component system comprising at least three components, characterized in that one of the components (component I) is a resin composition comprising (a) an unsaturated polyester resin and/or a methacrylate functional resin, (b) reactive diluent and optionally a copper salt, copper complex, iron salt and/or iron complex, one of the components (component II) is an accelerator solution as described above and at least one of the other components (component III) comprises a peroxide.

The peroxide can be any peroxide known to the skilled in the art for being able to initiate of the free-radical chain growth crosslinking polymerization between the reactive diluent and the resin present in the resin composition. The peroxide is preferably selected from the group of hydroperoxides, which includes the group of perketals. Preferably, the hydroperoxide is selected from the group of organic hydroperoxides. The peroxide being most preferred in terms of handling properties and economics is methyl ethyl ketone peroxide (MEK peroxide). The amount of peroxide can be varied within wide ranges, in general less than 20 wt. %, and preferably less than 10 wt. %.

The multi-component systems according to the invention are suitable for being applied in structural applications. As used herein, suitable for structural applications means that the resin composition upon curing by means of peroxide initiated radical copolymerization results in structural parts. As meant herein, structural parts are considered to have a thickness of at least 0.5 mm and appropriate mechanical properties. The term "structural parts" as meant herein also includes cured resin compositions as are used in the field of chemical anchoring, construction, roofing, flooring, windmill blades, containers, tanks, pipes, automotive parts, boats, etc. The present invention therefore also relates to the use of such a multi-component system in any one of the areas of chemical anchoring, construction, roofing, flooring, windmill blades, containers, tanks, pipes, automotive parts or boats. The present invention also relates to structural parts obtained by mixing the components of such a multi-component system.

As used herein, the term "multi-component system" refers to systems where separate components are being spatially separated from each other, for instance in separate cartridges or the like, and is intended to include any system wherein each of such separate components may contain further separate compounds. The components are combined at the time the system is used.

The present invention further also relates to a process for peroxide initiated radical curing of a resin composition as described above whereby the radical curing is performed by mixing the resin composition with a peroxide. The present invention further also relates to a process for peroxide initiated radical curing of a resin composition comprising (a) an unsaturated polyester resin and/or a methacrylate functional resin and (b) reactive diluent, whereby the radical curing is performed by mixing the resin composition with an accelerator solution as described above and with a peroxide. Preferably, the radical copolymerisation is effected essentially free of cobalt and essentially free of titanium. Essentially free of cobalt means that the cobalt concentration is lower than 0.02 mmol Co per kg unsaturated polyester resin, methacrylate functional resin and reactive diluent; preferably lower than 0.01 mmol Co per kg unsaturated polyester resin, methacrylate functional resin and reactive diluent; even more preferably lower than 0.001 mmol Co per kg unsaturated polyester resin, methacrylate functional resin and reactive diluent. Essentially free of titanium as used here means that the titanium concentration is lower than 0.02 mmol Ti per kg unsaturated polyester resin, methacrylate functional resin and reactive diluent, preferably lower than 0.01 mmol Ti per kg unsaturated polyester resin, methacrylate functional resin and reactive diluent, more preferably lower than 0.001 mmol Ti per kg unsaturated polyester resin, methacrylate functional resin and reactive diluent. Most preferably the radical copolymerisation is effected free of cobalt and free of titanium. Preferably, the radical curing is effected at a temperature in the range of from −20 to +200°

C., preferably in the range of from −20 to +150° C., and more preferably in the range of from −10 to +80° C., and even more preferably at room temperature. For the purpose of the invention room temperature is defined as a temperature from 0 to 60° C., preferably from 10 to 40° C., more preferably from 10 to 35° C. and even more preferably from 20 up to and including 25° C.

The present invention further relates to a structural part obtained by curing a resin composition according to the present invention or obtained by mixing the components of the multi-component system according to the invention. The present invention finally relates to the use of such a structural part in automotive, boats, chemical anchoring, roofing, construction, containers, relining, pipes, tanks, flooring or windmill blades.

The invention is now demonstrated by means of a series of examples and comparative examples. All examples are supportive of the scope of claims. The invention, however, is not restricted to the specific embodiments as shown in the examples.

EXPERIMENTAL PART

Unless otherwise indicated, the amounts given in the experimental part are weight amounts.

Synthesis Resin A

An unsaturated polyester was prepared by polycondensation of 105 parts of maleic anhydride, 314 parts of phthalic anhydride, 244 parts of 1,2-propylene glycol. The starting compounds were charged into a reactor equipped with condenser, stirrer, a temperature control system and an inlet for nitrogen. Under a gentle flow of nitrogen, the reaction mixture was heated up and maintained at a temperature of 210° C. The acid value dropped slowly and at the end of the process, vacuum was applied to help stripping the water from the reaction mixture to reach the targeted acid value and viscosity. An acid value of 52 mg KOH/g resin and a viscosity of 364 mPa·s was reached. 600 g of this resin was diluted in a mixture of 340 g vinylbenzoate and 60 g divinyladipate resulting in resin A.

Synthesis Resin B

An epoxy vinylester resin (methacrylate functional resin) was prepared by charging into a reactor equipped with condenser, stirrer, a temperature control system and an inlet for nitrogen 67 g bisphenol A glycidylether, 13 g bisphenol A, 0.9 mg hydroquinone and 1.5 mg triphenylphosphine. Under a gentle flow of nitrogen, the reaction mixture was heated up to 135° C. Around 90° C., an exotherm starts which heats the reaction mixture up to 135° C. after which the reaction was maintained at this temperature for 30 min before cooling down to 110° C. Next 20 g methacrylic acid was added in 4 portions of 5 g with 15 minutes intervals followed by stirring the reaction mixture for an additional 2 hrs at this temperature. After cooling down to 90° C., 55 g hydroxyl ethyl methacrylate and 95 g dimethyl itaconate were added as reactive diluents and the reaction mixture was allowed to cool down to room temperature resulting in resin B.

Monitoring of Curing

In the Examples presented hereinafter it is mentioned, that curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

Materials for Curing

Cu=Rockwood Nuodex Cu 8 (copper naphthenate in mineral spirits, 8% Cu),
Co=Akzo NL-49P (cobalt naphthenate in mineral spirits, 1% Co),
Mn=Rockwood Nuodex Mn 10 (manganese ethylhexanoate, 10% Mn),
Fe=Iron naphthenate in mineral spirits (12% Fe, Alfa Aesar),
K=Caldic Liocat 110 (potassium octanoate, 10% K in ethanol),
Al=Aluminium triacetate (Sigma Aldrich),
Ca=Rockwood Nuodex 10 (Calcium ethylhexanoate, 10% Ca),
V=Vanadium(V) oxytriisopropoxide (Aldrich),
Ti=Titanium(IV) butoxide (Aldrich),
Zr=Zirconium 2-ethylhexanoate in mineral spirits (10% Zr, abcr),
Na=Sodium 2-ethylhexanoate (Alfa Aesar),
Li=Lithium 2-ethylhexanoate (Alfa Aesar),
Bi=bismuth 2-ethylhexanoate in mineral spirits (24.6% Bi, abcr).

The peroxides used are commercially available from Akzo-Nobel except hydrogen peroxide which was obtained from Aldrich.

Synthesis of Enaminones Typical Procedure:

In a round bottom flask charged with 13 g of ethylacetocetate (100 mmol) and 100 ml toluene, was added 6.1 g ethanol amine (100 mmol). After fitting a Dean-Stark set up, water was azeotropically removed. Heating was continued until no water was any longer formed. After evaporation of the solvent, the enaminone was obtained quantitatively.

Following a similar procedure, the following enaminones were prepared based on: ethylacetoacetate, acetyl acetone, benzoylacetone, 1,3-cyclohexanedione and N,N-diethylacetoacetamide as ketones and ethanol amine, diethanolamine, N-methylethanolamine, piperidine, p-toluidine and Jeffamine® D230 (polyether diamine) as amines.

Depending on the starting materials and the enaminone formed, other solvents like for example ethanol can also be used for the azeotropic water removal.

Enaminones A-K according to the following formula are obtained. X, R1, R2 and R3 are specified in Table 1.

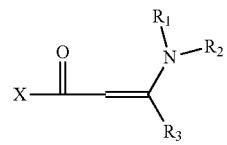

TABLE 1

| Enaminone | $R_1$ | $R_2$ | $R_3$ | X |
|---|---|---|---|---|
| A | H | $CH_2CH_2OH$ | $CH_3$ | $OCH_2CH_3$ |
| B | H | $CH_2CH_2OH$ | $CH_3$ | $CH_3$ |
| C | $CH_2CH_2OH$ | $CH_2CH_2OH$ | $CH_3$ | $CH_3$ |
| D | $CH_3$ | $CH_2CH_2OH$ | $CH_3$ | $CH_3$ |
| E | $CH_2CH_2CH_2CH_2CH_2$ (R1 and R2 form a cycle) | | $CH_3$ | $CH_3$ |
| F | H | $C_6H_4CH_3$ | $CH_3$ | $CH_3$ |
| G | H | $CH_2CH_2OH$ | $CH_3$ | $C_6H_5$ |
| H | H | $C_6H_4CH_3$ | $CH_3$ | $C_6H_5$ |
| I | H | $CH_2CH_2OH$ | $CH_3$ | $N(CH_2CH_3)_2$ |

TABLE 1-continued

| Enaminone | $R_1$ | $R_2$ | $R_3$ | X |
|---|---|---|---|---|
| J | H | Polymeric with enaminone substituent | $CH_3$ | $CH_3$ |
| K | H | $CH_2CH_2OH$ | $CH_2CH_2CH_2$ ($R_3$ and X forms cycle) | |
| L | H | $CH_2CH_2OH$ | $C_6H_5$ | $C_6H_5$ |

An enaminone according to the following formula has also been prepared (enaminone J) (Jeffamine® D230 was used as amine):

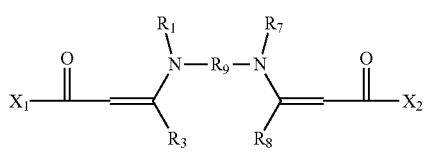

with $X_1=X_2=CH_3$, $R_1=R_7=H$, $R_3=R_8=CH_3$ and $R_9$=polyether.

Example 1 and Comparative Experiments A

To 100 g of resin A was added 1 g enaminone A, and 3 mmol of various metal compounds per kg of resin A. After stirring for 3 min, 3% Butanox M50 (peroxide) was added and the cure was monitored with the gel time equipment. The results are shown in table 2.

TABLE 2

| Ex | Metal | Enaminone | Gel time (min) | Peak time (min) | Peak temperature (° C.) |
|---|---|---|---|---|---|
| 1.1 | Cu | A | 0.9 | 2.1 | 156 |
| 1.2 | Fe | A | 1.2 | 3.1 | 152 |
| A1 | | A | >1200 | | |
| A2 | Cu | | >1200 | | |
| A3 | Fe | | >1200 | | |
| A4 | Co | | >1200 | | |
| A5 | Co | A | >1200 | | |
| A6 | V | | >1200 | | |
| A7 | V | A | >1200 | | |
| A8 | Mn | | >1200 | | |
| A9 | Mn | A | >1200 | | |
| A10 | K | A | >1200 | | |
| A11 | Al | A | >1200 | | |
| A12 | Ca | A | >1200 | | |
| A13 | Ti | A | >1200 | | |
| A14 | Zr | A | >1200 | | |
| A15 | Bi | A | >1200 | | |
| A16 | Cu wire | A | >1200 | | |
| A17 | Fe wire | A | >1200 | | |

This table demonstrates that for an efficient curing of an unsaturated polyester (UP) diluted in a vinyl ester reactive diluent both an enaminone and copper or iron salt/complex are needed. Employing only enaminone (A1) resulted in no curing, similar to employing only copper salt/complex (A2) or iron salt/complex (A3).

When employing Co, V or Mn salt/complex with or without enaminone (A4-A9), i.e. transition metals which are frequently used in curing UP resins, also no cure was observed. This illustrates the fact that not all transition metal salts/complexes in combination with enaminones can result in an efficient curing but only iron salt/complex and copper salt/complex in combination with enaminones are able to result in efficient curing.

Further, from A16 and A17, in which Cu wire respectively Fe wire has been added to the reaction tube, it is clear that using pure Cu compound or pure Fe compound does not give acceleration. Only when using a Cu or Fe salt/complex (examples 1.1 & 1.2), efficient acceleration is obtained.

Example 2 and Comparative Experiments B

To 100 g of Palatal P4-01 (unsaturated polyester diluted in styrene, commercially available from DSM Composites Resins, Schaffhausen, C H) was added enaminone B and various metal salts, such that the amounts of metal were as stated in table 3. After stirring for 3 min, 2% Butanox M50 was added and the cure was monitored with the gel time equipment. The results are shown in table 3.

TABLE 3

| | metal | Amount (mmol/kg Palatal P4-0) | enaminone | amount mmol/kg Palatal P4-01 | Gel time (min) | Peak time (min) | Peak temperature (° C.) |
|---|---|---|---|---|---|---|---|
| 2.1 | Cu | 0.126 | B | 6.2 | 9.6 | 15.9 | 146 |
| B1 | Cu | 0.126 | | | >1200 | | |
| B2 | Co | 0.16 | B | 6.2 | 34.2 | 68.7 | 88 |
| B2 | Co | 0.16 | | | 52.3 | 89.1 | 81 |

This table illustrates that the combination of enaminone and copper salt is a very efficient combination also for curing unsaturated polyester resins in styrene as reactive diluent.

In case Co salt is used in an unsaturated polyester in styrene (B3), the addition of enaminone (B2) results in a small rate enhancement. Employing however Cu salt instead of Co salt (2.1 vs B2) a significantly more efficient curing is observed even when a lower amount of Cu is used.

Examples 3 and Comparative Experiments C

To 100 g of Palatal P4-01 was added 1.5 mmol enaminone B and Cu, Fe, Mn, or Co salts/complexes in various amounts, such that the amounts of metal were as stated in table 4 below. After stirring for 3 min, 2% Butanox M50 was added and 25 g of the formulations were poured in plastic beakers resulting in castings with a thickness of approximately 1 cm. After 24 h, the Barcol hardness of the bottom of the casting was determined with a Barcol 934-1 hardness tester according to ASTM D2583. The results are given in Table 4.

TABLE 4

| | Metal | Amount metal (mmol/kg Palatal P4-01) | Barcol 934-1 |
|---|---|---|---|
| 3.1 | Cu | 0.013 | 45-50 |
| 3.2 | Cu | 0.13 | 40-45 |
| 3.3 | Fe | 0.13 | 10-15 |
| 3.4 | Fe | 1.29 | 40-45 |
| C1 | none | 0 | 0 |
| C2 | Co | 0.17 | 0-5 |
| C3 | Mn | 0.18 | 0 |

These examples clearly demonstrate that the combination of enaminone with Cu or Fe salt gives cured castings with increased Barcol hardness (examples 3.1-3.4) compared to when using enaminone alone (comp ex C1). The Barcol hardness is a measure for the stiffness of the cured material and as such an indication for the degree of cure. The combinations of enaminone with other transition metal salts/complexes like Mn or Co give no or only a minor improvement of the hardness (comp ex C2&C3).

Example 4

To 100 g of Palatal P4-01 was added various enaminones and various metal salts, such that the amounts of metal were as stated in table 5. After stirring for 3 min, 2% Butanox M50 was added and the cure was monitored with the gel time equipment. The results are shown in table 5.

TABLE 5

|  | Metal | mmol/kg Palatal P4-01 | Enaminone | mmol/kg Palatal P4-01 | Gel time (min) | Peak time (min) | Peak temperature (° C.) |
|---|---|---|---|---|---|---|---|
| 4.1 | Cu | 1.26 | B | 6.2 | 6.4 | 10.8 | 128 |
| 4.2 | Cu | 1.26 | C | 9.7 | 19.8 | 35.8 | 112 |
| 4.3 | Cu | 1.26 | E | 6 | 34.3 | 55.1 | 116 |
| 4.4 | Cu | 1.26 | F | 5.2 | 29.8 | 44.3 | 115 |
| 4.5 | Cu | 1.26 | G | 5.8 | 8.8 | 15.8 | 117 |
| 4.6 | Cu | 1.26 | H | 4 | 122 | 169 | 41 |
| 4.7 | Cu | 1.26 | J | 5 | 6.4 | 10 | 130 |
| 4.8 | Fe | 1.9 | B | 6.2 | 7.4 | 17.6 | 116 |
| 4.9 | Fe | 1.1 | J | 5 | 11.9 | 24.5 | 87 |

Example 5

To 100 g of resin A was added various enaminones and various metal salts, such that the amounts of metal were as stated in table 6. After stirring for 3 min, 3% Butanox M50 was added and the cure was monitored with the gel time equipment. The results are shown in table 6.

TABLE 6

|  | metal | mmol/kg resin A | Enaminone | mmol/kg resin A | Gel time (min) | Peak time (min) | Peak temperature (° C.) |
|---|---|---|---|---|---|---|---|
| 5.1 | Cu | 3 | B | 20 | 1.8 | 3.3 | 185 |
| 5.2 | Cu | 0.5 | D | 10 | 8.3 | 11.6 | 192 |
| 5.3 | Cu | 3 | I | 20 | 2.9 | 6.7 | 178 |
| 5.4 | Cu | 0.55 | K | 6.9 | 27.2 | 36.8 | 177 |
| 5.5 | Cu | 0.5 | G | 10 | 10.3 | 13.8 | 195 |
| 5.6 | Fe | 5 | D | 10 | 1.8 | 5.5 | 185 |
| 5.7 | Fe | 0.5 | D | 10 | 9.8 | 16.1 | 93 |
| 5.8 | Cu | 3 | L | 10 | 23.8 | 44.5 | 146 |
| 5.9 | Fe | 3 | L | 30 | 8.5 | 27.1 | 59 |
| 5.10 | Cu + Fe | 0.25 + 0.25 | D | 10 | 7.8 | 11 | 193 |

Examples 4 and examples 5 demonstrate that various enaminones can be used in combination with copper and/or iron salt in order to obtain an efficient curing. Examples 4.7 and 4.9 demonstrate that a polymeric bis-enaminone can be used.

Example 5.4, in which a trans-enaminone is used, demonstrates that besides cis-enaminones, also trans-enaminones can be used according to the invention. Example 5.10 demonstrates that besides Cu salt or Fe salt alone also mixtures of Cu and Fe salts can be used which, when comparing to examples 5.7 and 5.2, appears to be even a bit more active.

Example 6

To 100 g of Palatal P4-01 was added 1.5 mmol enaminone B and copper naphthenate in various amounts as stated in table 7. After stirring for 3 min, 2% Butanox M50 was added and the cure was monitored with the gel time equipment. The results are shown in table 7.

TABLE 7

|  | metal | amount mmol/kg Palatal P4-01 | enaminone | amount mmol/kg Palatal P4-01 | Gel time (min) | Peak time (min) | Peak temperature (° C.) |
|---|---|---|---|---|---|---|---|
| 6.1 | Cu | 0.126 | B | 15 | 4.6 | 8.6 | 151 |
| 6.2 | Cu | 0.063 | B | 15 | 5.3 | 9.8 | 155 |
| 6.3 | Cu | 0.031 | B | 15 | 5.7 | 11.2 | 155 |
| 6.4 | Cu | 0.0068 | B | 15 | 7.3 | 14.8 | 147 |
| 6.5 | Cu | 0.0025 | B | 15 | 8.5 | 17.8 | 138 |
| 6.6 | Cu | 0.0013 | B | 15 | 9.4 | 19.3 | 131 |

These examples demonstrate that even with copper amounts as low as 1.3 micromol/kg still an efficient curing can be obtained, being indicative of the fact that this is a very efficient cure system.

It should be noted as further comparison that when employing Cobalt salt in an amount as low as 0.0013 mmol/kg. no cure could be detected with the gel time equipment and this finding further illustrates the efficiency of this cure system.

Example 7

To 100 g of Palatal P4-01 was added various amounts of enaminone B and 0.126 mmol copper naphthenate as stated in table 8. After stirring for 3 min, 2% Butanox M50 was added and the cure was monitored with the gel time equipment. The results are shown in table 8.

TABLE 8

|  | metal | amount mmol/kg Palatal P4-01 | enaminone | amount mmol/kg Palatal P4-01 | Gel time (min) | Peak time (min) | Peak temperature (° C.) |
|---|---|---|---|---|---|---|---|
| 7.1 | Cu | 1.26 | B | 123 | 1.2 | 3.3 | 140 |
| 7.2 | Cu | 1.26 | B | 62 | 1.4 | 3.6 | 138 |
| 7.3 | Cu | 1.26 | B | 31 | 2.2 | 4.4 | 134 |
| 7.4 | Cu | 1.26 | B | 15 | 3 | 5.6 | 131 |
| 7.5 | Cu | 1.26 | B | 3.1 | 13.1 | 24.1 | 116 |
| 7.6 | Cu | 1.26 | B | 1.5 | 27.5 | 43.8 | 50 |

These examples illustrates that various amounts of enaminone can be used.

Example 8

To 100 g of various resins (see Table 9), 0.62 mmol enaminone B and 0.127 mmol copper naphthenate were added. After stirring for 3 min, 2% Butanox M50 was added and the cure was monitored with the gel time equipment. The results are shown in table 9.

TABLE 9

| Resin | type | Diluent | Gel time (min) | Peak time (min) | Peak temperature (° C.) |
|---|---|---|---|---|---|
| 8.1 Synolite-8388-N-1 | DCPD | Styrene (40) | 14.6 | 21.5 | 138 |
| 8.2 Atlac-580 | Bisphenol A vinylester urethane | Styrene (47) | 18.8 | 29.1 | 135 |
| 8.3 Palatal P6-01 | Ortho resin | Styrene (35) | 6.3 | 8.8 | 178 |
| 8.4 resin B | Epoxy vinyl ester | HEMA (22) DMI (38) | 31.7 | 44.9 | 53 |

These examples in combination with example 1 demonstrate that various resins i.e. ortho resins, DCPD resins, epoxy vinylester resins, and urethane vinylester resins diluted in various reactive diluents like styrene, vinyl benzoate, hydroxyl ethyl methacrylate and dimethyl itaconate can be employed in the present invention.

Example 9

To 100 g of various resins was added various amounts of various enaminones and various amounts of copper naphthenate and optionally various amounts of base e.g. potassium octanoate (see table 10). After stirring for 3 min, 2% Butanox M50 was added and the cure was monitored with the gel time equipment. The results are shown in table 10.

TABLE 10

| | Resin | Cu (mmol/kg resin) | enaminone | Amount (mmol/kg resin) | K (mmol/kg resin) | Gel time (min) | Peak time (min) | Peak temp (° C.) |
|---|---|---|---|---|---|---|---|---|
| 9.1 | Palatal P4-01 | 0.0068 | B | 15 | | 7.3 | 14.8 | 147 |
| 9.2 | Palatal P4-01 | 0.0068 | B | 15 | 12.8 | 4.4 | 10.9 | 144 |
| 9.3 | Palatal P4-01 | 0.0025 | B | 15 | | 8.5 | 17.8 | 138 |
| 9.4 | Palatal P4-01 | 0.0025 | B | 15 | 14.4 | 5 | 12.9 | 138 |
| 9.5 | Palatal P4-01 | 0.0013 | B | 15 | | 9 | 19.3 | 131 |
| 9.6 | Palatal P4-01 | 0.0013 | B | 15 | 12.8 | 4.9 | 14.6 | 122 |
| 9.7 | Palatal P4-01 | 1.26 | F | 11 | | 25 | 37 | 120 |
| 9.8 | Palatal P4-01 | 1.26 | F | 11 | 12.8 | 3.9 | 7.4 | 128 |
| 9.9 | Palatal P4-01 | 1.26 | F | 5 | | 29.8 | 44.3 | 115 |
| 9.10 | Palatal P4-01 | 1.26 | F | 5 | 12.8 | 4.3 | 8 | 125 |
| 9.11 | Synolite 8388 | 1.26 | B | 6.2 | | 14.6 | 21.5 | 138 |
| 9.12 | Synolite 8388 | 1.26 | B | 6.2 | 12.8 | 6.6 | 11.1 | 145 |

These examples demonstrate that the cure of a resin composition according to the invention can even be further enhanced by the addition of a base.

Example 10 and Comparative Experiment C

To 100 g of Palatal P4-01 was added 0.6 mmol enaminone B and 0.126 mmol copper naphthenate. After stirring for 3 min, various amounts of various peroxides were added and the cure was monitored with the gel time equipment. The results are shown in table 11.

TABLE 11

| | peroxide | type | Amount (%) | Gel time (min) | Peak time (min) | Peak temperature (° C.) |
|---|---|---|---|---|---|---|
| 10.1 | Butanox M50 | Methyl ethyl ketone peroxide | 1 | 11.2 | 16.7 | 113 |
| 10.2 | Butanox M50 | | 2 | 6.4 | 10.8 | 128 |
| 10.3 | Butanox M50 | | 3 | 4.7 | 9.6 | 137 |
| 10.4 | Trigonox 44B | Acetylacetone peroxide | 2 | 28.5 | 37.7 | 130 |
| 10.5 | Butanox LPT-IN | Methyl ethyl ketone peroxide | 2 | 6.3 | 10.7 | 137 |
| 10.6 | Hydrogen peroxide (30% in water) | | 2 | 5.3 | 13.3 | 113 |
| 10.7 | Trigonox 239 | Cumyl hydroperoxide | 2 | 88.6 | 123.2 | 43 |
| 10.8 | Cyclonox LE-50 | Cyclohexanone peroxide | 2 | 6.7 | 10.4 | 109 |

These examples demonstrate that various peroxides in various amounts can be applied in the present invention.

Example 12

To 100 g of resin A was added 1 g enaminone A and 3 mmol copper salt per kg of resin A. After stirring for 3 min, 3% of various peroxides were added and the cure was monitored with the gel time equipment. The results are shown in below table.

TABLE 12

| | Peroxide | Gel time (min) | Peak time (min) | Peak temperature (° C.) |
|---|---|---|---|---|
| 12.1 | Butanox M50 (methylethylketone peroxide) | 1.2 | 2.7 | 154 |
| 12.2 | Perkadox CH50L (dibenzoyl peroxide) | 44.5 | 63.4 | 115.5 |

The examples 12.1 and 12.2 show that different peroxides can be used.

Example 13

Preparation of Accelerator Solution 1.49 g Nuodex Cub was diluted with 5.97 g vinyl benzoate, resulting in a 1.6% Cu solution. 14.9 g enaminone D was dissolved in 9.4 g ethanol resulting in an enaminone solution.

An accelerator solution was prepared by mixing 2 g of the 1.6% Cu solution with 2.56 g of the enaminone solution. After stirring for 5 min, the accelerator solution was left to stand overnight.

Use of the Accelerator Solution 0.456 g of the accelerator solution was added to 100 g of resin A (resulting in 10 mmol enaminone D/kg resin A and 0.5 mmol Cu/kg resin A analogues to example 4.2) and cured using 3% Butanox M50 resulting in a gel time of 7.9 min, a peak time of 11.6 min and a peak temperature of 193° C.

Example 14

Preparation of Accelerator Solution

An accelerator solution was prepared by mixing and dissolving 4 g butoxy ethanol, 2 g propylene glycol, 1.8 g enaminone B and 2 g copper naphthenate (8% Cu). After gentle heating and cooling down overnight, a clear accelerator solution was obtained.

Use of the Accelerator Solution 0.5 g of the accelerator solution was added to 100 g Palatal P4-01 (resulting in 6.2 mmol enaminone B/kg Palatal P4-01 and 1.26 mmol Cu/kg Palatal P4-01 analogues to example 2.1). After stirring for 5 min, 2% Butanox M50 was added and the cure was monitored with the gel time equipment resulting in a gel time of 6.2 min, a peak time of 10.4 min and a peak exotherm of 126° C.

Examples 13 and 14 illustrate that a mixture of enaminone and copper salt or iron salt can be used for accelerating the peroxide curing of unsaturated polyester resins. Comparing example 5.2 (gel time 8.3) with example 13 (gel time 7.9) and example 2.1 (gel time 9.6 min) with example 14 (gel time 6.2 min) demonstrate that using a premixed solution of the enaminone and the copper/iron, the cure can be further accelerated compared to adding the individual accelerator ingredients to the resin just before the peroxide is added, although sometimes the effect is minimal.

The invention claimed is:

1. A radically curable resin composition comprising:
   (a) an unsaturated polyester resin and/or a methacrylate functional resin,
   (b) a reactive diluent,
   (c) 0.001-10 mmol/kg (a)+(b) of a $Fe^{2+}$, $Fe^{3+}$, $Cu^+$ or $Cu^{2+}$ salt or complex; and
   (d) 0.5-150 mmol/kg (a)+(b) of an enaminone compound according to formula I:

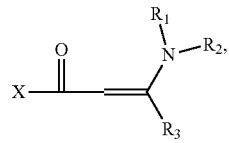

wherein
   $X = C_1-C_{20}$ alkyl, $C_6-C_{10}$ aryl, $OR_4$ or $NR_5R_6$,
   $R_4$, $R_5$ and $R_6$ are independently selected from $C_1-C_{20}$ alkyl;
   $R_1$ is independently selected from H and optionally substituted $C_1-C_{18}$ alkyl, in which the optional substituents are hydroxyls; $R_2$=hydroxyl substituted C1-C18 alkyl;
   $R_3 = C_1-C_{20}$ alkyl or $C_6-C_{10}$ aryl; and optionally wherein $R_3$ and X can form a (hetero)cycle.

2. The resin composition according to claim 1, wherein $R_1$ is an optionally substituted $C_1-C_{12}$ alkyl.

3. The resin composition according to claim 1, wherein the compound (c) is present in the resin composition in such amount that the total amount of copper and iron in the resin composition is equal to or higher than 0.1 mmol/kg (a)+(b) and equal to or lower than 5 mmol/kg (a)+(b).

4. The resin composition according to claim 1, wherein the compound (c) is a $Cu^+$ and/or $Cu^{2+}$ carboxylate.

5. The resin composition according to claim 1, wherein the compound (c) is a $Fe^{2+}$ and/or $Fe^{3+}$ carboxylate.

6. The resin composition according to claim 1, wherein the ratio of molar amount of the enaminone compound and molar amount of copper and iron is from 2500:1 up to and including 1:2.

7. The resin composition according to claim 1, wherein the resin composition further comprises a base selected from the group consisting of alkaline bases, earth alkaline bases, amines and any mixture thereof.

8. The resin composition according to claim 1, wherein the reactive diluent is styrene.

9. The resin composition according to claim 1, wherein the reactive diluent is vinyl ester.

10. A multi-component system comprising at least two components, wherein one of the components is the resin composition according to claim 1 and at least one of the other components comprises a peroxide.

11. A multi-component system comprising at least three components, wherein
   a first one of the components is a resin composition comprising (a) an unsaturated polyester resin and/or a methacrylate functional resin and (b) a reactive diluent,
   a second one of the components is an accelerator solution comprising (1) an enaminone compound and (2) a $Fe^{2+}$, $Fe^{3+}$, $Cu^+$ or $Cu^{2+}$ salt or complex; wherein the ratio of molar amount of the enaminone compound to molar amount of copper and iron is from 15000:1 up to and including 1:2, and
   at least a third one of the components comprises a peroxide, wherein
   the enaminone compound is a compound of formula I:

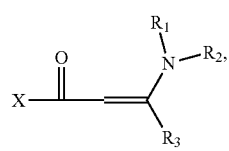

wherein

X=$C_1$-$C_{20}$ alkyl, $C_6$-$C_{10}$ aryl, $OR_4$ or $NR_5R_6$, $R_4$, $R_5$ and $R_6$ are independently selected from $C_1$-$C_{20}$ alkyl;

$R_1$ is independently selected from H and optionally substituted $C_1$-$C_{18}$ alkyl, in which the optional substituents are hydroxyls; $R_2$=hydroxyl substituted C1-C18 alkyl;

$R_3$=$C_1$-$C_{20}$ alkyl or $C_6$-$C_{10}$ aryl; and optionally wherein $R_3$ and X can form a (hetero)cycle.

12. The multi-component system according to claim 10, wherein the peroxide is a hydroperoxide or a mixture of hydroperoxides, whereby a perketal is considered a hydroperoxide.

13. The multi-component system according to claim 12, wherein the hydroperoxide is an organic hydroperoxide.

14. The multi-component system according to claim 10, wherein the peroxide is methyl ethyl ketone peroxide.

15. A method for radical curing of a resin composition, wherein the method comprises mixing the resin composition according to claim 1 with a peroxide and effecting curing of the resin composition at room temperature.

16. A method for radical curing of a resin composition comprising (a) an unsaturated polyester resin and/or a methacrylate functional resin and (b) a reactive diluent, wherein the method comprises:

(i) mixing the resin composition with an accelerator solution comprising (1) an enaminone compound and (2) a $Fe^{2+}$, $Fe^{3+}$, $Cu^+$ or $Cu^{2+}$ salt or complex; wherein the ratio of molar amount of the enaminone compound to molar amount of copper and iron is from 15000:1 up to and including 1:2, and a peroxide, and (ii) effecting curing at room temperature, wherein the enaminone compound is a compound of formula I:

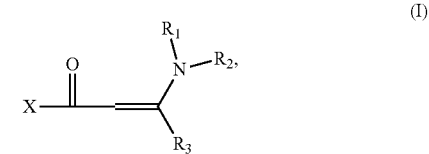

wherein

X=$C_1$-$C_{20}$ alkyl, $C_6$-$C_{10}$ aryl, $OR_4$ or $NR_5R_6$, $R_4$, $R_5$ and $R_6$ are independently selected from $C_1$-$C_{20}$ alkyl;

$R_1$ is independently selected from H and optionally substituted $C_1$-$C_{18}$ alkyl, in which the optional substituents are hydroxyls; $R_2$=hydroxyl substituted C1-C18 alkyl;

$R_3$=$C_1$-$C_{20}$ alkyl or $C_6$-$C_{10}$ aryl; and wherein $R_3$ and X can form a (hetero)cycle.

17. The method according to claim 15, wherein the peroxide is a hydroperoxide or a mixture of hydroperoxides, whereby a perketal is considered a hydroperoxide.

18. The method according to claim 17, wherein the hydroperoxide is an organic hydroperoxide.

19. The method according to claim 15, wherein the peroxide is methyl ethyl ketone peroxide.

20. A structural part obtained by curing the resin composition according to claim 1 with a peroxide.

21. The structural part according to claim 20, wherein the structural part is selected from the group consisting of automotive parts, boat parts, chemical anchoring, roofing, construction parts, containers, relining, pipes, tanks, flooring and windmill blades.

22. A structural part obtained by curing the multi-component system according to claim 10.

* * * * *